Oct. 4, 1960 M. P. BAKER 2,954,992
BALL AND SOCKET JOINT ASSEMBLY AND METHOD OF MAKING SAME
Filed Feb. 15, 1955 3 Sheets-Sheet 1

INVENTOR.
Max P. Baker
BY John X. Marvin
HIS ATTORNEY

Oct. 4, 1960　　　　M. P. BAKER　　　　2,954,992
BALL AND SOCKET JOINT ASSEMBLY AND METHOD OF MAKING SAME
Filed Feb. 15, 1955　　　　　　　　　　3 Sheets-Sheet 2

INVENTOR.
Max P. Baker
BY John T. Martin
HIS ATTORNEY

Oct. 4, 1960 M. P. BAKER 2,954,992
BALL AND SOCKET JOINT ASSEMBLY AND METHOD OF MAKING SAME
Filed Feb. 15, 1955 3 Sheets-Sheet 3

INVENTOR.
Max P Baker
BY
HIS ATTORNEY

United States Patent Office 2,954,992
Patented Oct. 4, 1960

2,954,992

BALL AND SOCKET JOINT ASSEMBLY AND METHOD OF MAKING SAME

Max P. Baker, Dayton, Ohio, assignor to General Motors Corporation, Detroit, Mich., a corporation of Delaware Filed Feb. 15, 1955, Ser. No. 488,216

6 Claims. (Cl. 287—90)

This invention relates to universal joint assemblies and in particular a ball and joint assembly adapted for use with a tie rod in steering mechanisms of automobiles.

It is an object of this invention to provide a ball and joint assembly with a moldable non-metallic composition in the space between the ball and the socket thereby providing an effective and improved bearing surface between the parts.

A further object of this invention is to provide a ball and socket assembly which has a support of a non-metallic composition such as nylon or a phenolic resin molded in situ within the space between the ball and the socket and which includes means whereby "creep" of the nylon composition support due to the pressure exerted by the ball against the nylon composition surfaces is prevented.

Another object of this invention is to provide a ball and socket assembly which has a non-metallic composition molded within the space between the ball and the socket having provided for controlling degree of tightness with respect to the ball and the socket.

A ball and joint constructed in accordance with the above objects has many advantages over presently known ball joints. As will be seen its structure is relatively simple, eliminating the need for springs and the like which are common in presently known ball joints for holding the ball positioned in the socket. It is sturdy, durable and self-lubricating and requires no maintenance after installation. Since the support is molded directly about the ball, the tolerances between the insert and ball are very close and a constant frictional resistance to movement between the parts results, thus eliminating the squeals and groans attending presently known devices in operation. The present ball joint assembly further is less costly, and has a greater capacity to absorb shock due to the resilient nature of nylon.

Further objects and advantages of the present invention will be apparent from the following description, reference being had to the accompanying drawings wherein preferred embodiments of the present invention are clearly shown.

In brief, the present invention involves a socket having a recess or cavity of a suitable shape adapted for loosely receiving the ball of a ball stud. One end of the socket is open for receiving the ball stud and is adapted for receiving a closure plate, while the other end is provided with an aperture through which the stud projects when the ball is positioned in the socket and thus permits pivotal motion of the stud. After the ball is positioned in the socket, and the closure plate is secured in the socket opening, a synthetic resin composition such as nylon or a high impact phenolic resin composition is preferably injected into the space between the ball and socket through a relatively small opening in the socket assembly. The synthetic resin composition completely fills the space between the ball and socket so as to completely surround the ball and form a supporting surface. The injection opening may be closed after injection of the synthetic resin composition to prevent "creep" when in use due to pressure exerted by the ball against the support.

Figure 1:
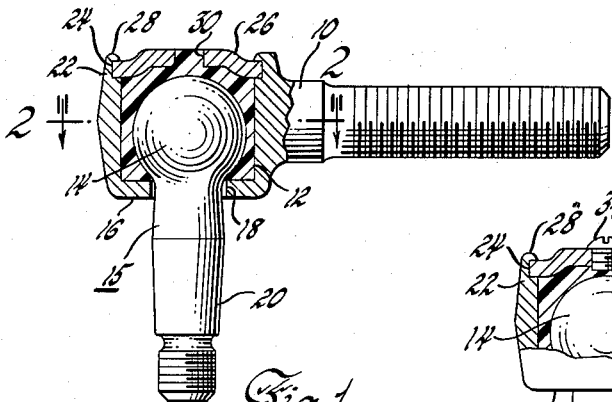
Figure 1 is a cross sectional view of one form of the invention.
Figure 2:
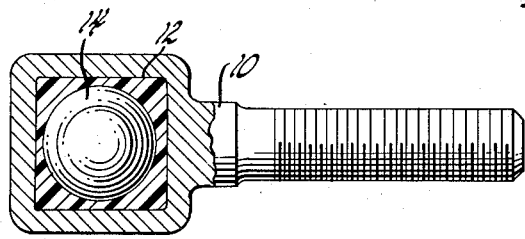
Figure 2 is a sectional top view of the structure shown in Figure 1 taken along line 2—2 thereof.
Figure 4:
Figure 4 is an end plate shown in perspective.

Referring now to the drawings, Figures 1 and 2 show one embodiment of the invention. A socket 10 having a rectilinear recess or cavity 12 therein is adapted to receive a ball 14 of a ball stud 15. One end 16 of the socket 10 is provided with an opening 18 which is adapted to receive stud 20 of the ball stud 15. The other end 22 of the socket 10 is opened and is provided with a peripheral offset 24 which supports closure plate 26. The edge 28 of the socket 10 may be spun or staked over to secure the plate 26 in place.

Figure 8:
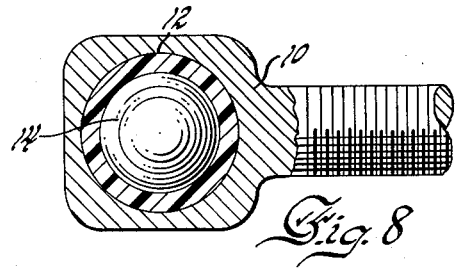
Figure 8 is a sectional top view of the structure shown in Figure 7 taken along line 8—8.
Figure 9:
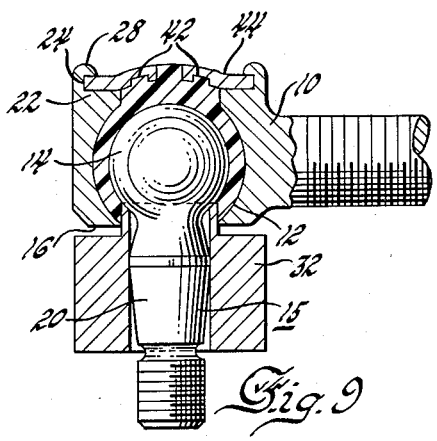
Figure 9 is a sectional view of still another embodiment of the invention.

It should be understood that the cavity 12 within the socket 10 may be of any shape which is best suited to the use to which the ball joint is put. For example, it may be rectilinear, or substantially spherical as shown in Figures 7–9.

The opening 18 in socket 10 through which the stud 20 projects may be of any suitable shape so as to permit the degree of pivotal motion of the ball stud desired. Thus for some purposes wherein a relatively small pivotal motion is desired, the opening 18 may be circular so that when the ball 14 is positioned in socket 10 the ball 14 engages the inner periphery of opening 18 as shown in Figure 1. If the use to which the ball joint is put requires a greater degree of pivotal movement or some other type of movement the opening 18 may be enlarged or elongated accordingly.

In the preferred embodiment and after the ball 14 is positioned in the socket 10 and the plate 26 is secured in place a nylon composition is injected through an opening or aperture 30 of the closure plate 26 so that the nylon completely fills the cavity and completely surrounds the ball 14 as shown.

Figure 6:
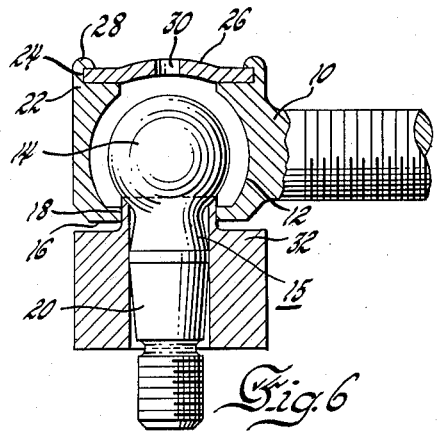
Figures 6 and 7 are sectional views showing a mandrel type plug associated with a ball and socket which may be used in molding the non-metallic moldable composition support in the space between the ball and socket.
Figure 7:
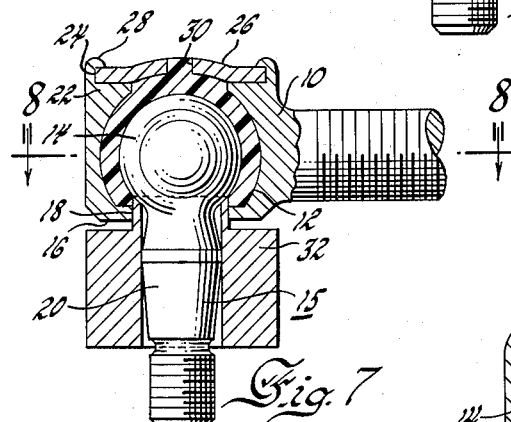

If the opening 18 is elongated, it is not fully closed by the ball as shown in Figures 6 and 7. To prevent the nylon from flowing out of the socket assembly through the opening 18 during the molding process, a split mandrel type plug 32, as shown in Fig. 6 for example, may be inserted into the space between stud 20 and opening 18, as shown in Figures 6 and 7. For some uses wherein a considerable degree of universal pivotal motion of the stud with respect to the socket is desired, the opening 18 may be considerably larger than the stud 20 at the point where the ball joins the stud and the mandrel type plug 32 may be used both to position the ball and prevent the nylon composition from passing out of the opening 18 during the molding process.

Figure 5:
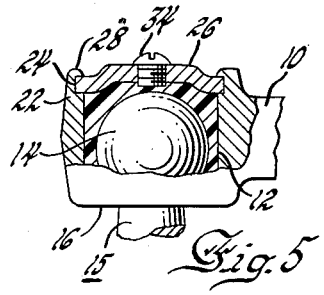
Figure 5 is a partial fragmentary view of still another embodiment of the invention.
Figure 3:
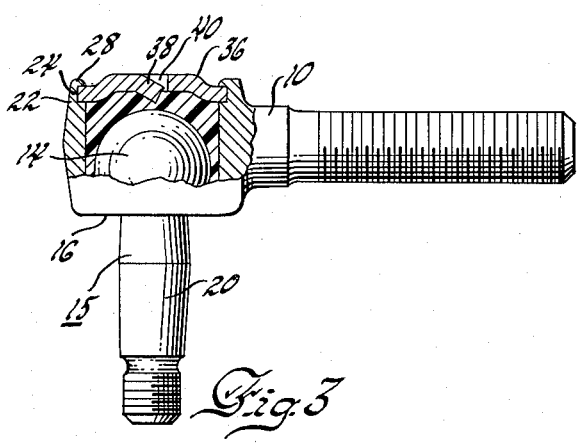
Figure 3 is a partial sectional view showing another embodiment.

As shown in Figures 3 and 5, the opening or aperture 30 may be closed after the nylon composition is injected into the cavity 12. As shown in Figure 5 the aperture 30 may be threaded and closed by a screw 34. In the use of the ball joint, pressure of the ball 14 against the nylon support may cause the nylon to "creep" out of the opening 30. This is prevented by closing opening 30. In the embodiment shown in Figure 3 a plate 36 is used as a closure plate which has a tang 38 formed integral therewith and which extends inwardly from the periphery of aperture 40 of plate 36 at an acute angle. The angle must be great enough to permit passage of nylon therethrough during the injection thereof but sufficiently small so that during the use of the ball joint, the nylon creep in the direction of the closure plate 36, will cause pressure to be exerted against the tang 38 and bend it so as to substantially close the opening 40 thus substantially preventing further creep. To this end the opening 40 and tang 18 is disposed in plate 36 in line with the direction of greatest pressure imposed by ball 14. It is obvious that this embodiment has the advantage of a unitary closure plate 36 having an injection aperture 40 which in use will be closed automatically.

Although the invention has been described in terms of a ball joint as shown in the drawing, it is obvious that the invention may be modified in various ways. For example the end 22 may be formed closed and the end 16 open to receive a ball of a ball stud. In such an embodiment a closure plate, having an opening therein through which the stud may project, may be secured to the open end 16 and the nylon composition can be injected through a suitable opening formed in a wall of the socket.

The support which is molded in place tends to bond superficially to the engaged ball and socket surface. It is therefore necessary to forcibly move the ball relative to the socket to cause the support to break away from the ball before the ball joint may be used. However, it is apparent that the resulting joint has relatively close tolerances and smooth operation.

Any suitable non-metallic moldable composition may be used in the present invention which has suitable impact properties. A nylon composition preferably containing from 1 to 2 percent molybdenum sulfide mixed therewith to reduce and lead out the initial force necessary to move the ball against a nylon support and which results in a smooth and silent movement of the ball against the nylon support is particularly suitable. High impact fiber filled phenolic resins are also suitable. Other synthetic resins which may be utilized in the present invention include amino resins and polytetrafloroethylene.

The nylon composition referred to throughout the specification is a linear or fiber forming polyamide disclosed in U.S. Patents 2,071,253 and 2,130,948

Figure 10:
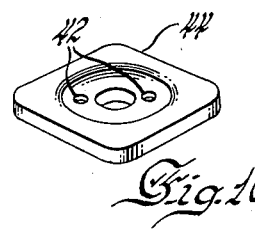
Figure 10 is an end plate in perspective of the end plate shown in the embodiment of Figure 9.

It is obvious that when the recess or cavity 12 has a round rather than a rectilinear shape with respect to the axis of the ball stud, the support may be rotated within the socket cavity. Since the setting of the moldable material is normally attended by some contraction, the support is more tightly engaged around the ball than against the socket walls. This structure may be utilized where it may be desirable that the assembly permits easy rotation of the ball stud when the socket and ball stud are in axial alignment. Where nylon is used, the degree of contraction of the nylon on setting may be controlled by the addition of suitable fillers, such as sawdust, to the nylon composition to achieve the relative degree of tightness between the parts. A ball joint of this type may if desired be formed to have the support non-rotatable with respect to the socket by providing depressions 42 in the internal side of the closure plate 44 as shown in Figures 9 and 10.

Figure 11:
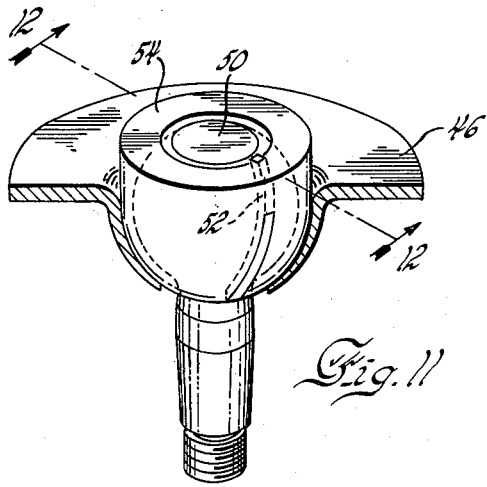
Figure 11 shows another embodiment of the present invention shown in perspective.
Figure 12:
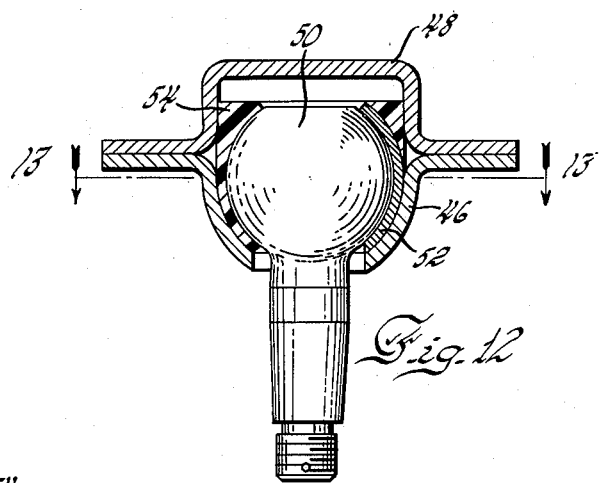
Figure 12 is a cross sectional side view of Figure 11.
Figure 13:
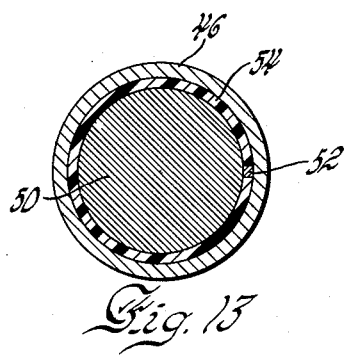
Figure 13 is a cross sectional top view of Figure 11.

Another embodiment of the present invention is shown in Figures 11, 12 and 13 wherein a relatively loose fit is provided between the ball and the support. Referring to Figure 12, a socket consists of a lower portion 46 and an upper portion 48. As shown in Figure 11, a ball stud 50 is positioned in lower socket portion 46 by means of a mandrel plug (not shown) as, for example, plug 32 of Figure 6. A relatively narrow strip of relatively soft material 52 such as silicone rubber or soft metal is disposed along the periphery of ball 50 in a direction generally longitudinal of the stud. The strip 52 is of any suitable shape such as square, rectangular or round and of sufficient thickness so that a sealing engagement is effected between lower socket member 46, strip 52 and ball 50 as shown in Figure 12. A suitable injection mold member (not shown) is placed over lower socket member 46 and support 54 is molded in place. The mold member is removed and socket member 48 is placed over the support 54 and spot welded or otherwise secured to lower socket member 48 to form a ball and socket assembly as shown in Figure 12. The strip 52 breaks the continuity of the support 54 at one end so as to prevent excessive shrinkage stress of the support 54 about ball 50 and excessive tightness between the parts. After the molding process, the strip 52 may be removed. However, if the strip is formed of a material having a relatively low coefficient of friction with respect to the ball, it may be left in place. If the molding process is attended by considerable heat, the strip 52 must, of course, be adequately heat resistant. The support member 54, as shown in Figure 12, does not have a broken surface in its upper portions and is shown wedged or secured between upper socket member 48 and lower socket member 46. However, it is obvious that various modifications may be made to suit a particular purpose without departing from the spirit of the invention. The support may be transfer molded or injection molded as shown in Figure 1 with obvious modifications.

Although the present invention has been described in the form of a ball joint, it may obviously have various other applications. For example, the socket may be open on both ends and the ball may have studs projecting from each end thereof to form a pivotal device for translating rotary motion through a joint. In such an embodiment mandrel type plugs may be applied to both ends of the socket in the nylon molding process and an injection orifice may be disposed in a wall of the socket. Other applications will be apparent to those skilled in the art.

Related types of ball joints are described and claimed in my copending applications, Serial Nos. 488,187, now Patent No. 2,879,091 and 488,289, now Patent No. 2,919,150 filed concurrently herewith and assigned to the assignee of the present invention.

While the embodiments of the present invention as herein disclosed, constitute preferred form, it is to be understood that other forms might be adopted.

What is claimed is as follows.

1. In a method of making a ball and socket joint assembly having a moldable non-metallic support, which has at least one open end, interposed in space between the ball and the socket, the steps of positioning the ball of a ball stud in a socket; positioning a strip of material along the periphery of said ball in a direction generally longitudinal of said stud so as to fit into part of the space between the ball and socket, molding a moldable non-metallic composition support in situ within the remaining space between said ball, socket and strip which is embedded at one end for simultaneously controlling degree of tightness with respect to the ball and said socket for embracing the ball and retaining said strip.

2. A ball and socket joint assembly, comprising in combination, a stud having at one end thereof a ball with a substantially spherical outer periphery, a socket having a cavity with a space therein adapted to receive said ball and having at least in part a spherical inner periphery spaced a predetermined distance from and complementary to said spherical outer periphery of said ball, a support member of moldable high-impact-resistant non-metallic material having an annular shape provided in the cavity at locations intermediate said ball and said socket so as to engage said ball and form a supporting surface therefor around all but a predetermined portion of cavity space, said cavity space being laterally open in part and arcuately bridged in part by said member, and a relatively narrow strip of relatively soft material disposed immediately adjacent to and formed to have an arcuate surface area to complement said ball along said spherical outer periphery thereof so as to occupy the predetermined space from a location adjacent to said stud to a location remote from said stud, said strip having a thickness substantially equal to the predetermined distance between said spherical inner periphery of said socket and the spherical outer periphery of said ball such that continuity of the supporting surface of said support member is broken and supplemented by said strip which engages both the outer periphery of said ball and said socket at only one end adjacent to said stud, said strip having a position extending longitudinally in alignment with said stud along the outer periphery of said ball such that said strip at a location remote from said stud is embedded in part relative to said support member for control of tightness of fit thereof with respect to said ball and socket.

3. The ball and socket joint assembly as claimed in claim 2 wherein the moldable material is a high impact phenolic resin.

4. The ball and socket joint assembly as claimed in claim 2 wherein the moldable material is nylon.

5. The ball and socket joint assembly claimed in claim 2 wherein said strip of material is softer than the moldable material.

6. In a method of making a ball and socket joint assembly having a moldable non-metallic support that has at least one open end for an outwardly extending stud carried by the ball and that is interposed in space between the ball and socket, the steps, comprising, placing a ball having a substantially spherical outer periphery in a socket having in part a substantially spherical inner periphery complementary to though spaced outwardly from the outer periphery of said ball in a location at a predetermined distance relative to one end of the stud extending through an opening of the socket, fitting a strip of adequately heat-resistant material having a relatively low coefficient of friction at a location along the periphery of said ball in a direction generally longitudinally relative to the stud in a portion of space between the ball and socket, plugging the socket opening with a mandrel fitted around the stud for also supporting and positioning the ball, and molding a support of moldable high-impact-resistant non-metallic material to fill remaining space between the ball and socket so as to embed the strip partially in the non-metallic material which surrounds said strip relative to the ball for only partially splitting the support at a location where the inner periphery of the socket is complementary to the periphery of the ball so as to control tightness of the ball, socket, support and strip relative to each other.

References Cited in the file of this patent

UNITED STATES PATENTS

| | | |
|---|---|---|
| 1,872,259 | Eldridge | Aug. 16, 1932 |
| 1,881,601 | Hufferd et al. | Oct. 11, 1932 |
| 1,980,117 | Turner et al. | Nov. 6, 1934 |
| 2,292,675 | Thiry | Aug. 11, 1942 |
| 2,327,113 | Kratz | Aug. 17, 1943 |
| 2,345,564 | Allen | Apr. 4, 1944 |
| 2,364,512 | Bower | Dec. 5, 1944 |
| 2,461,626 | Booth | Feb. 15, 1949 |
| 2,791,454 | Saives | May 7, 1957 |

OTHER REFERENCES

Wall: Page 102 of Product Engineering, July 1950.
Place: Page 360 of Product Engineering, August 1940.